United States Patent
Wang et al.

(10) Patent No.: US 9,212,310 B2
(45) Date of Patent: Dec. 15, 2015

(54) DUAL-FREQUENCY BISTABLE LIQUID CRYSTAL DISPLAY AND THE LIQUID CRYSTAL MIXTURE THEREOF

(71) Applicants: Shyh-Yueh Wang, Taichung (TW);
Xin-Jiu Wang, Taichung (TW);
Chia-Hui Chen, Taichung (TW);
Chiu-Yuan Huang, Taichung (TW);
Yen-Liang Chen, Taichung (TW)

(72) Inventors: Shyh-Yueh Wang, Taichung (TW);
Xin-Jiu Wang, Taichung (TW);
Chia-Hui Chen, Taichung (TW);
Chiu-Yuan Huang, Taichung (TW);
Yen-Liang Chen, Taichung (TW)

(73) Assignee: POWERTIP TECHNOLOGY CORPORATION, Taichung (TW)

( * ) Notice: Subject to any disclaimer, the term of this patent is extended or adjusted under 35 U.S.C. 154(b) by 188 days.

(21) Appl. No.: 14/074,882

(22) Filed: Nov. 8, 2013

(65) Prior Publication Data

US 2015/0131039 A1 May 14, 2015

(51) Int. Cl.
*G02F 1/137* (2006.01)
*G02F 1/139* (2006.01)
*C09K 19/20* (2006.01)
*C09K 19/22* (2006.01)
*C09K 19/02* (2006.01)

(52) U.S. Cl.
CPC ................ *C09K 19/22* (2013.01); *C09K 19/02* (2013.01); *C09K 19/2007* (2013.01); *G02F 1/1391* (2013.01); *G02F 1/1392* (2013.01); *G02F 1/13718* (2013.01); *C09K 2019/2078* (2013.01); *G02F 2001/13706* (2013.01); *G02F 2001/13712* (2013.01)

(58) Field of Classification Search
CPC ..... C09K 19/02; C09K 19/2007; C09K 19/22; C09K 2019/2078; G02F 1/13718; G02F 2001/13712; G02F 2001/13706; G02F 2001/1391; G02F 1/1392
See application file for complete search history.

(56) References Cited

U.S. PATENT DOCUMENTS

| | | | | |
|---|---|---|---|---|
| 5,621,552 A * | 4/1997 | Coates et al. | ................... | 349/86 |
| 6,154,267 A * | 11/2000 | Kondo et al. | ................. | 349/156 |
| 7,612,835 B2 * | 11/2009 | Hsu et al. | ......................... | 349/36 |
| 2009/0098314 A1* | 4/2009 | Takaku et al. | .................. | 428/1.1 |
| 2009/0290078 A1* | 11/2009 | Yang et al. | ....................... | 349/16 |

OTHER PUBLICATIONS

CAPLUS 2011:603955.*

* cited by examiner

*Primary Examiner* — Shean C Wu
(74) *Attorney, Agent, or Firm* — Patent Office of Bang Shia

(57) ABSTRACT

A dual-frequency bistable liquid crystal display and the liquid crystal mixture thereof includes liquid crystal cell filled with a liquid crystal mixture which contains dual-frequency liquid crystal, chiral compound, and nematic liquid crystal mixture. The liquid crystal mixture has the characteristics of both the dual-frequency liquid crystal and cholesteric liquid crystal. The dual-frequency bistable liquid crystal display is driven in a frequency modulation mode and can be switched between two optical states by taking advantage of the dielectric anisotropy of the liquid crystal, which results in a short switching time and sharp contrast between two optical states. Furthermore, the maintaining of the two optical states requires no voltage, which does not require the use of a high voltage to destabilize the helical structure of the cholesteric liquid crystal, and does not have to go through a metastable stage. Hence, power consumption and switching time are reduced.

17 Claims, 4 Drawing Sheets

DUAL-FREQUENCY BISTABLE LIQUID CRYSTAL DISPLAY AND THE LIQUID CRYSTAL MIXTURE THEREOF

BACKGROUND OF THE INVENTION

1. Field of the Invention

The present invention relates to a liquid crystal display, and more particularly to a dual-frequency bistable liquid crystal display and the liquid crystal mixture thereof.

2. Description of the Prior Art

The special electro-optic characteristic of the liquid crystal is that the liquid crystal is able to display images after being electrified. However, for some electronic equipments, such as the E-reader, smart phone, and electronic tag, and etc., there is strict requirements on the display to be used, for example, the power consumption should be very low and service life should be longer than, say, five years. Therefore, a bistable liquid crystal display made of nematic liquid crystal or cholesteric liquid crystal with appropriate device parameter and relative material parameters is a good solution. Then voltage is used to induce two types of alignments of the liquid crystal, so as to display images with a certain contrast level. Once the image is formed, the voltage doesn't have to be maintained, which satisfies the requirements for low power consumption and long life.

The nematic liquid crystal display generally includes ZBD (Zenithal Bitable Display) and BiNem display (Nemoptic), both of which use specially designed surface alignment layer to achieve the bistability. The cholesteric liquid crystal is formed by mixing of nematic liquid crystal and chiral compound, and then the mixture of the nematic liquid crystal and chiral compound helically deforms to form the cholesteric liquid crystal. Cholesteric liquid crystal mainly includes SSCT (surface stabilized cholesteric texture) which applies positive cholesteric liquid crystal having positive dielectric anisotropy. The helical pitch of cholesteric liquid crystal is within visible light range. When the cholesteric liquid crystal is applied with a high enough voltage, the helical structure of the positive cholesteric liquid crystal will deform into nematic alignment structure which is unstable and perpendicular to the substrate layer. The unstable structure will be destabilized into planar texture or focal-conic texture when applied with a voltage, which induces two types of stable alignments of the cholesteric liquid crystal, forming the bistable liquid crystal display.

Merck developed a dual-frequency nematic liquid crystal (MLC-2048), as compared to the nematic liquid crystal whose alignment is controlled by voltage, the alignment of dual-frequency nematic liquid crystal is controlled by the frequency as well. Furthermore, the dielectric anisotropy ($\Delta\epsilon$) of the dual-frequency nematic liquid crystal is positive ($\Delta\epsilon>0$), when the frequency is relatively low, $\Delta\epsilon>0$ when the frequency is relatively high. As compared to the ordinary nematic liquid crystal, dual-frequency nematic liquid crystal possesses the characteristics of both positive and negative nematic liquid crystal, and therefore has a faster response time and is more suitable for producing high performance optical and display equipments.

However, when switching between two stable states of alignments (perpendicular ⇋parallel, or one parallel to another parallel), the ordinary nematic liquid crystal nematic liquid crystal will experience a metastable stage, which still has the problem of high power consumption. Besides, the SSCT, after removal of voltage, will has the problem of longer response time when switching between two stable states due to complicated electric fluid dynamics.

The present invention has arisen to mitigate and/or obviate the afore-described disadvantages.

SUMMARY OF THE INVENTION

The primary objective of the present invention is to provide a dual-frequency bistable liquid crystal display and the liquid crystal mixture thereof. Wherein a liquid crystal mixture contains dual-frequency liquid crystal, chiral compound, and nematic liquid crystal mixture, is filled in a liquid crystal cell. The liquid crystal mixture has the characteristics of both the dual-frequency liquid crystal and cholesteric liquid crystal. The present invention is driven in a frequency modulation mode and can be switched between two optical states by taking advantage of the dielectric anisotropy of the liquid crystal. The present invention is switched between two optical states by taking advantage of the dielectric anisotropy of the liquid crystal, the switching time between two optical states is short, and the two optical states contrast is sharp. The invention does not require the use of a high voltage to destabilize the helical structure of the cholesteric liquid crystal, and does not have to go through a metastable stage. Hence, the power consumption and switching time are truly reduced.

To achieve the above objective, a dual-frequency bistable liquid crystal display in accordance with the present invention comprises: a liquid crystal cell filled with a liquid crystal, the liquid crystal cell including two opposite substrates, each of substrates having an inner surface and an outer surface, and the two inner surfaces face toward each other, and on each the inner surface being provided an electrode layer, at least on one of the electrode layers being provided an alignment layer, and a color layer being provided on the outer surface of one of the substrates. The dual-frequency bistable liquid crystal display is characterized in that: the liquid crystal is a dual-frequency liquid crystal mixture formed by mixing dual-frequency liquid crystal, chiral compound, and nematic liquid crystal mixture together, when at a low frequency, the dielectric anisotropy of the dual-frequency liquid crystal mixture is positive, and when at a high frequency, the dielectric anisotropy of the dual-frequency liquid crystal mixture is negative, and the dielectric anisotropy positive to negative switching frequency (or cross-over frequency) ranges from 50 Hz-50000 Hz. The dual frequency of the dual-frequency bistable liquid crystal mixture includes a negative switching frequency and a positive switching frequency which are respectively greater and smaller than the dielectric anisotropy positive to negative switching frequency by a small margin, when the frequency is higher than the negative switching frequency, a dielectric anisotropy parameter is negative, when frequency is lower than this positive switching frequency, the dielectric anisotropy parameter is positive.

Preferably, the dual-frequency bistable liquid crystal mixture contains 15-80 wt % of dual-frequency liquid crystal, 1-50% chiral compound, and 15-80 wt % nematic liquid crystal mixture. The dual-frequency liquid crystal may contain the liquid crystal mixture of the following compound A:

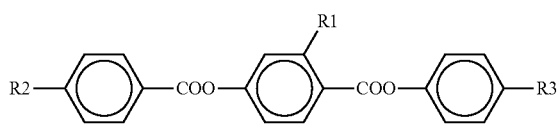

where the side group R1 of the compound A is selected from the following groups: cyano group (—C≡N), nitro group (—NO₂) or halides, the halides is selected from the following groups: the —F group, —Cl group, —Br group, —I group, or —At group, the first and second end groups R2, R3 are selected from the following groups: - alkyl group, -alkoxy group, alkenyl group, alkenyloxy group, cyano group (—C≡N). The side group R1 is preferably —F group or —Cl group or —CN group, and the first and second end groups R2, R3 are preferably—alkyl group.

Preferably, the nematic liquid crystal mixture may consist of the following compounds B:

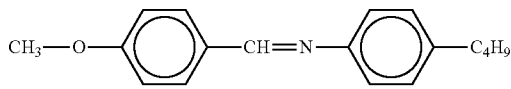

The chiral compound are commercially available, such as CB15, R811, R1011, R5011, S5011, S811, and the S5011, S811 are the enantiomer of the R5011, R811.

The optical birefringence of the liquid crystal ranges from 0.05 to 0.4, a helical pitch of liquid crystal molecules of the liquid crystal is 0.3 μm~4 μm, and a temperature of the liquid crystal ranges —40° C. ~80° C. The dual-frequency bistable liquid crystal mixture will have high negative dielectric anisotropy when applied with a frequency higher than the negative switching frequency, Δε=—0.1~—20, and the dual-frequency bistable liquid crystal mixture will have high positive dielectric anisotropy when applied with a frequency lower than the positive switching frequency, Δε=1~30.

Preferably, the two substrates of the liquid crystal cell are made of glass plate or plastic plate, and a distance ranging from 1-2 μm is defined between the inner surfaces of the two substrates. The color layer of the dual-frequency bistable liquid crystal display is subjected to disposition, coating or printing process to become a black layer or a color layer. The electrode layers are processed into a transparent conductive electrode after being subjected to disposition and etching process. The liquid crystal cell includes an optical layer disposed on the color layer of one of the substrates of the liquid crystal cell or on the outer surface of another one of the substrates.

When the applied voltage frequency is lower than the positive switching frequency, the liquid crystal homogeneous mixture will have a positive dielectric anisotropy, displaying a first color, and when the applied voltage frequency is higher than the negative switching frequency, the liquid crystal homogeneous mixture will have a negative dielectric anisotropy, displaying a second color, so that an image can be displayed.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
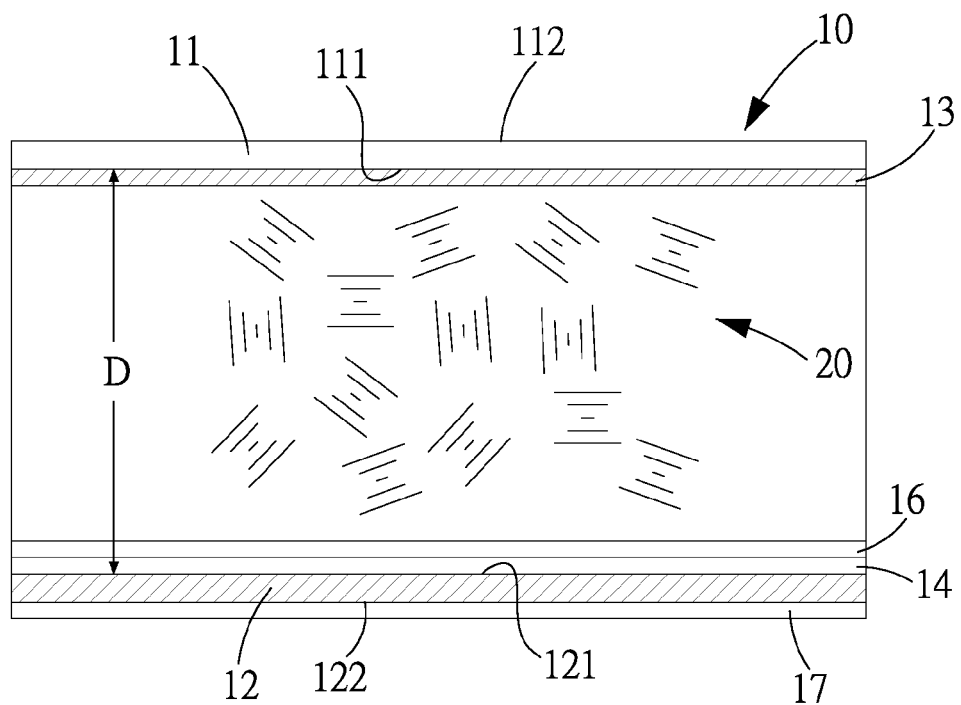
FIG. 1 shows that the alignment layer and the color layer of the liquid crystal cell of the present invention are disposed at the same substrate.
Figure 2:
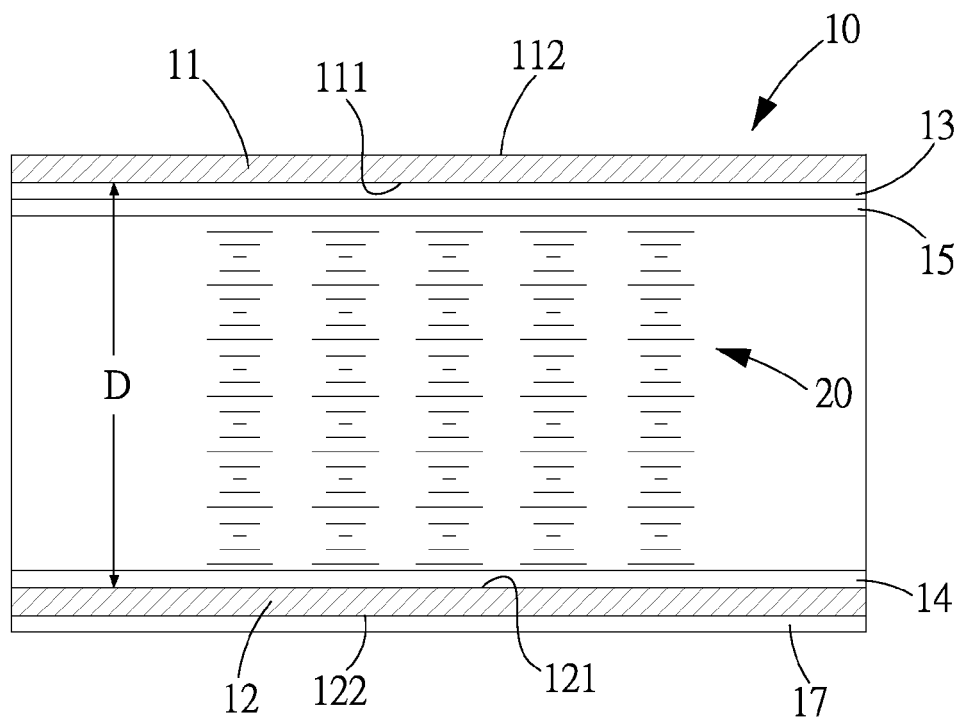
FIG. 2 shows that the alignment layer and the color layer of the liquid crystal cell of the present invention are disposed at different substrates.
Figure 3:
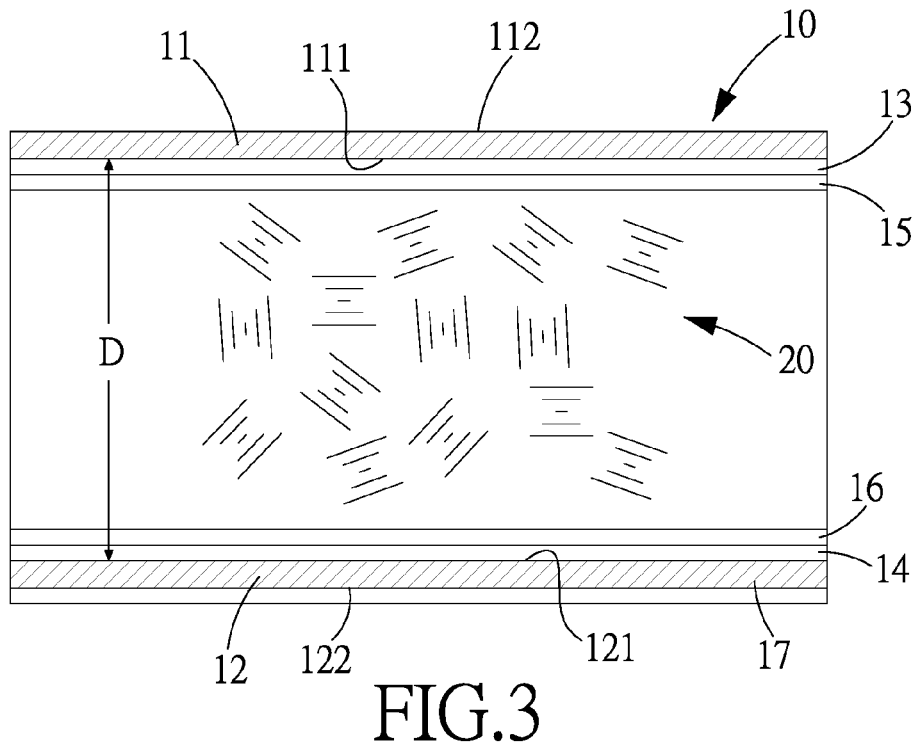
FIG. 3 shows that the alignment layer of the present invention is disposed at both of the two substrates.

Referring to FIG. 1-3, a dual-frequency bistable liquid crystal display in accordance with the present invention comprises: a liquid crystal cell 10 filled with a liquid crystal 20. The liquid crystal cell 10 includes two opposite substrates 11, 12, each of which has an inner surface 111, 121 and an outer surface 112, 122, and the two inner surfaces 111, 121 face toward each other. The substrates 11, 12 each are provided on the inner surface 111, 121 with an electrode layer 13, 14, at least on one of the electrode layers 13, 14 is provided an alignment layer 15, 16, and the liquid crystal 20 is provided on the outer surface 112, 122 of one of the substrates 11, 12 with a color layer 17.

The two substrates 11, 12 of the liquid crystal cell 10 are made of glass plate or plastic plate, and a perpendicular distance D ranging from 1-2 μm (1 μm≤D≤12 μm) is defined between the inner surfaces 111, 121 of the two substrates 11, 12 for filling of the liquid crystal 20. As shown in FIGS. 1 and 2, the liquid crystal cell 10 includes the single alignment layer 15, 16, which is disposed on the electrode layer 13, 14 in a parallel or perpendicular manner by subjecting the alignment layer 15, 16 to disposition, coating or printing process. Preferably, as shown in FIG. 3, the two alignment layers 15, 16 of the liquid crystal cell 10 are disposed on the electrode layers 13, 14, respectively. The two alignment layers 15, 16 are subjected to an appropriate treatment, such as directional rubbing process, to provide better anchoring effect toward the neighboring liquid crystal 20. The alignment layers 15, 16 can also be subjected to no rubbing treatment, or only have one side or two sides subjected to the rubbing treatment.

Figure 4:
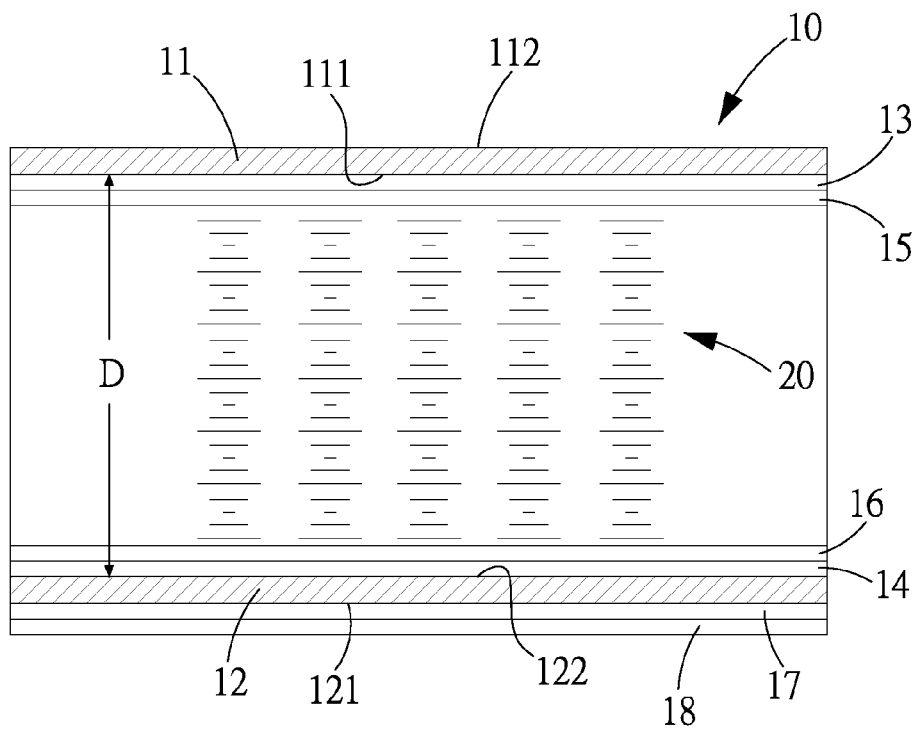
FIG. 4 shows that the optical layer of the present invention is disposed on the color layer of the liquid crystal cell.
Figure 5:
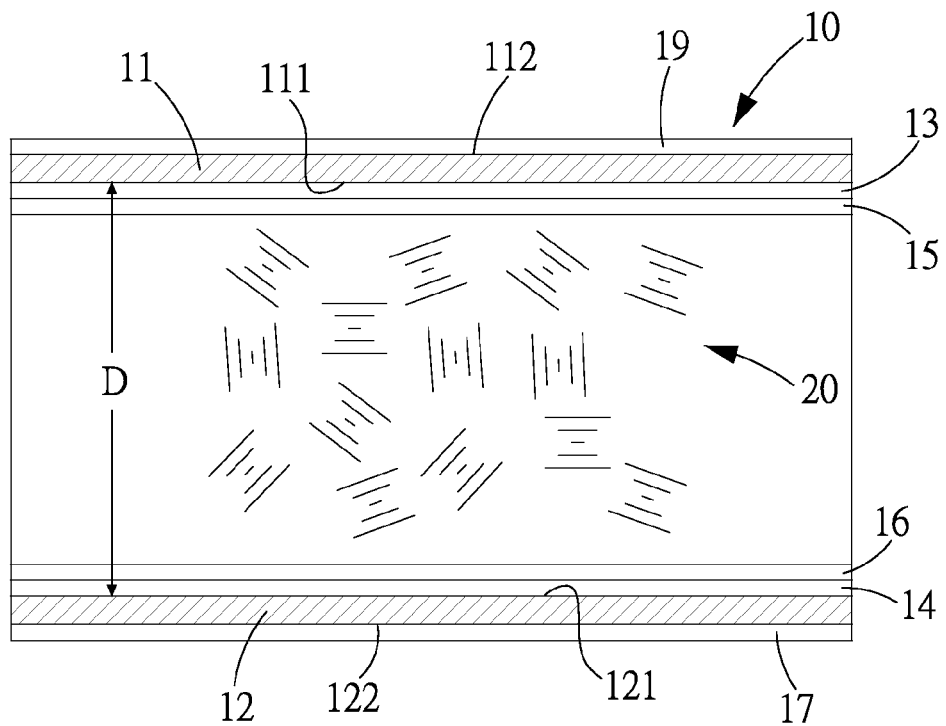
FIG. 5 shows that the optical layer of the present invention is disposed on the outer surface of the substrate of the liquid crystal cell.
Figure 6:
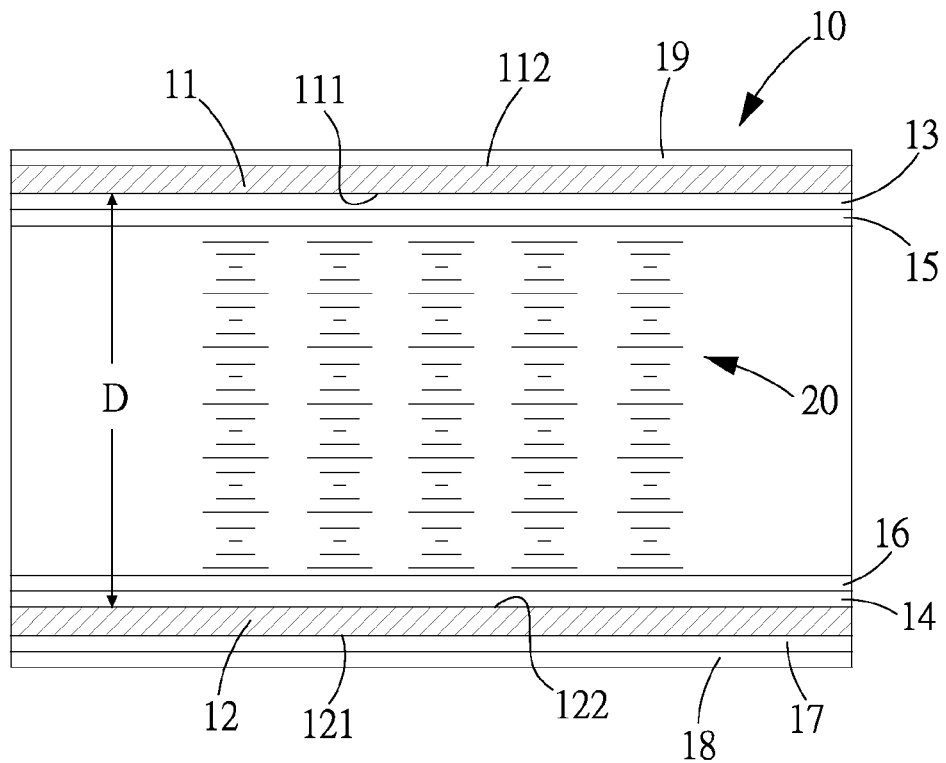
FIG. 6 shows that the optical layers of the present invention are disposed both on the color layer and the outer surface of the substrate of the liquid crystal cell.
Figure 7:
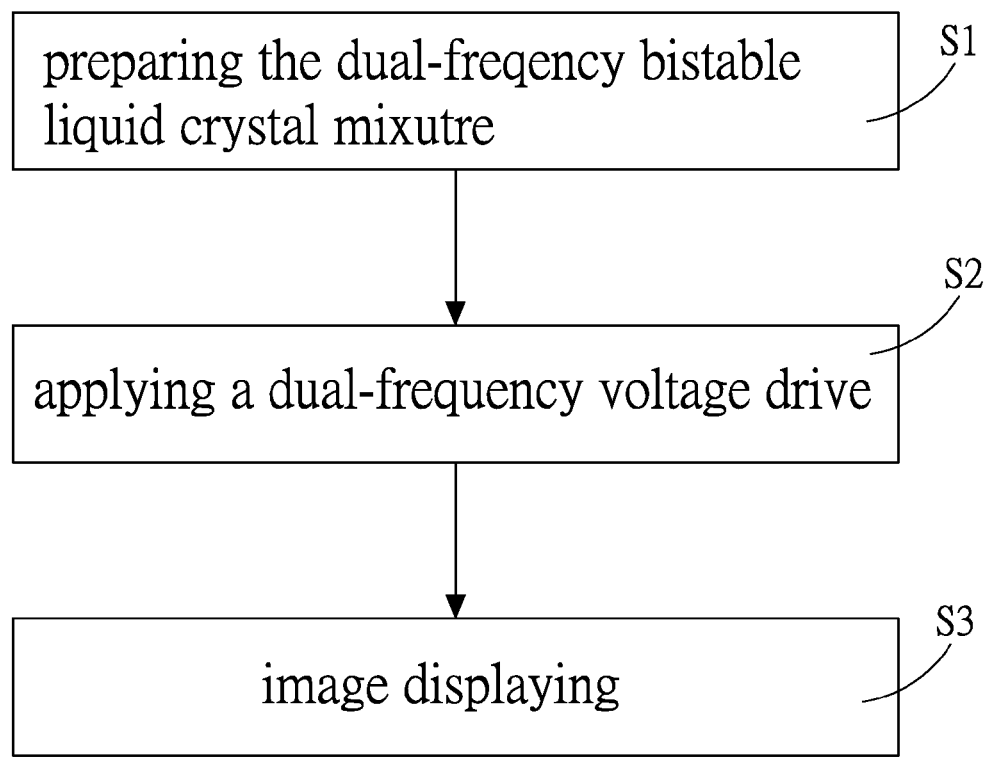
FIG. 7 is a flow chart showing the process for making the dual-frequency bistable liquid crystal display in accordance with the present invention.

The color layer 17 of the dual-frequency bistable liquid crystal display in accordance with the present invention can be subjected to disposition, coating or printing process to become a black layer or a color layer, so as to display a color image on a black or white background, or show black or white image on a color background, or show a color image on a background of a different color. Or, as shown in FIGS. 4 and 5, the liquid crystal cell 10 of the present invention can be subjected to disposition, coating or printing process to place an optical layer 18, 19 on the color layer 17 of one of the substrates 11, 12 of the liquid crystal cell 10 or on the outer surface 112, 122 of another of the substrates 11, 12, so as to improve image contrast and other advantages.

The liquid crystal 20 filled in the dual-frequency bistable liquid crystal display in accordance with the present invention is a dual-frequency bistable liquid crystal mixture which generally includes dual-frequency (nematic) liquid crystal and chiral compound. The dual-frequency liquid crystal is normally mixed with other liquid crystal mixture to obtain desired features of dual-frequency liquid crystal, such as: ultra-low cross-over frequency, suitable dielectric anisotropy, correct optical birefringence and thermodynamic characteristics satisfying with the requirement of display.

The liquid crystal 20 of the present invention is formed by blending the dual-frequency liquid crystal and the chiral compound with a nematic liquid crystal mixture to obtain a mixture which contains 15-80 wt % of dual-frequency liquid crystal, 1-50% chiral compound, and 15-80 wt % nematic liquid crystal mixture, then the mixture is filled in the liquid crystal cell 10, as shown in FIGS. 1-6, to achieve desired features. The desired features of the dual-frequency liquid crystal mixture of the present invention and the liquid crystal display made by the dual-frequency liquid crystal mixture are described as follows:

1. Ultra-low cross-over frequency: namely the dielectric anisotropy positive to negative switching frequency ranges from 50 Hz-50000 Hz.

2. the dual frequency of the dual-frequency bistable liquid crystal mixture includes a negative switching frequency and a positive switching frequency which are respectively greater than and smaller than the dielectric anisotropy positive to negative switching frequency, and the dual-frequency bistable liquid crystal mixture will have high negative dielectric anisotropy $\Delta\epsilon$ when applied with a frequency higher than the negative switching frequency, $\Delta\epsilon=-0.1\sim-20$.

3. the dual-frequency bistable liquid crystal mixture will have high positive dielectric anisotropy $\Delta\epsilon$ when applied with a frequency lower than the positive switching frequency, $\Delta\epsilon=1\sim30$.

4. correct optical birefringence (DR): $0.05 \geq DR \geq 0.4$), preferably, DR >0.15).

5. cholesteric liquid crystal temperature range: $-40°$ C. $\sim 80°$ C.

6. range of the helical pitch of the liquid crystal: 0.3 μm~4 μm. The dual-frequency liquid crystal may contain the liquid crystal mixture of the following compound A: (X-J comment—The compound A is only a good example which was tested in experiment. Any compounds displaying the dual-frequency feature would be the candidates for this invention.)

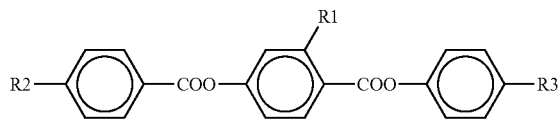

The molecular scaffolds of the compounds A essentially comprises two —COO— groups connected among three benzene rings and is normally structurally stable. The length of the molecular scaffolds of the compounds A is a key factor for affecting the dual-frequency liquid crystal performance. The molecular scaffolds of the compounds A comprises from left to right: a first benzene ring, a second benzene ring, a third benzene ring, and the two —COO— groups are connected between the first and second benzene rings and between the third and fourth benzene rings, respectively. The second benzene ring of the compound A is provided along a major axis thereof with four carbon atoms which are located two sides of the major axis, one of the four carbon atoms includes a replaceable side group R1. The compound A is provided at two ends of the major axis with a replaceable first end group R2 which is located at the first benzene ring, and a replaceable second end group R3 which is located at the second benzene ring.

The side group R1 of the compound A is a polar group to provide the compound A a lateral dipole moment, so that the dielectric permittivity component of the compound A, when frequency is high, will be perpendicular to the major molecular axis. The side group R1 of the compound A can be selected from the following groups: cyano group (—C≡N) nitro group (—NO$_2$) or halides, the halides is selected from the following groups: the —F group, —Cl group, —Br group, —I group, or —At group, wherein the side group R1 is preferably —F group or —Cl group or NC— group. The first and second end groups R2, R3 are selected from the following groups: —R group (alkyl), —OR group (alkoxy), alkenyl group, alkenyloxy group (—R), cyano group (—C≡N). The first and second end groups R2, R3, when frequency is low, enable the dielectric permittivity component of the compound A to be arranged along the molecular major axis.

For bonding configurations of the side group R1, and the first and second end groups R2, R3 of the compound A, please refer to the following two embodiments. As it is shown in the below drawing that the side group R1 of the compound A1 is —Cl, and the first and second end groups R2, R3 have the same —C$_5$H$_{11}$ group. The side group R1 of the compound A2 is —Cl group, the first end group R2 is —C$_7$H$_{15}$, and the second end group R3 is —C$_8$H$_{17}$.

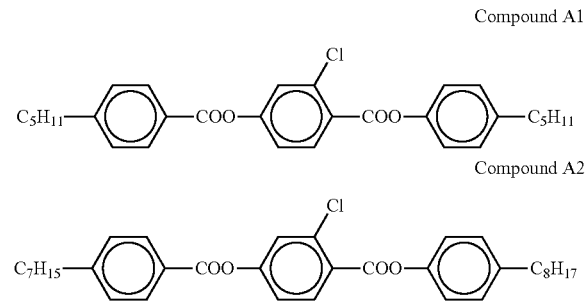

The nematic liquid crystal mixture of the dual-frequency bistable liquid crystal of the present invention can consist of the MBBA (4-methoxybenzlidene-4'-butylaniline), namely the following compound B: (X-J comment—The compound B is only an example which was tested in experiment. Any compounds displaying the negative dielectric anisotropy would be the candidates for this invention.)

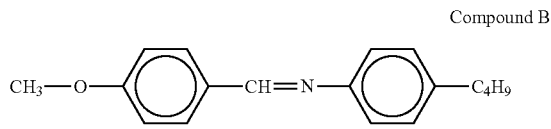

the dual-frequency liquid crystal mixture formed by the mixed compounds A and B will have dual frequency characteristic and low melting point, when the temperture is $-20°$ C. $\sim 70°$ C., and will have a relatively large liquid crystal phase range, and a better and balanced permittivity, when in a low or high frequency state.

The cholesteric liquid crystal characteristic of the dual-frequency bistable liquid crystal mixture of the present invention can be formed by chemical reaction, through which, the chiral center of the chiral compound replaces the end group of the dual frequency (nematic) liquid crystal, or the chiral compound is directly mixed with the dual-frequency liquid crystal. The dual-freqency bistable liquid crystal mixture of the present invention is formed by blending or mixing the dual-frequency liquid crystal (compound A), the nematic liquid crystal mixture (compound B) and the chiral compound, and the dual-frequency liquid crystal (compound A), the nematic liquid crystal mixture (compound B) and the chiral compound are formed into a homogeneous mixture in a non-chemical-reaction manner. The chiral compound of the present invention can be commercially available CB15, R811, R1011 and R5011 or the enantiomer of the aforementioned compounds, such as S5011, S811. Theses chiral compounds can be used alone or two or more chiral compunds are proportionally mixed. It is to be noted that currrenly chiral compounds have been used to produce TN or STN. To reduce the helical pitch of the dual-frequency bistable liquid crystal mixture of the present invention to 0.3~0.5 μm, the amount of the chiral compound of the present inveniton is much higher than the amount of the chiral compound used in producing of TN or STN.

Method for making the dual-frequency bistable liquid crystal display of the present invention comprises the following steps:

Step S1: preparing the dual-frequency bistable liquid crystal mixture: preparing 15-80 wt % of dual-frequency liquid crystal, 1-50% chiral compound, and 15-80 wt % nematic liquid crystal mixture, and mixing them together to obtain a homogeneous mixture which is then filled in the liquid crystal cell 10;

Step S2: applying a dual-frequency voltage drive scheme: in this step, the electrode layer 13, 14 of the liquid crystal cell 10 applies to the liquid crystal homogeneous mixture a voltage of different frequency which is either greater than or smaller than the dielectric anisotropy positive to negative switching frequency;

Step S3: image displaying: when the applied voltage frequency is lower than the positive switching frequency, the liquid crystal homogeneous mixture will have a positive dielectric anisotropy, displaying a first color, and when the applied voltage frequency is higher than the negative switching frequency, the liquid crystal homogeneous mixture will have a negative dielectric anisotropy, displaying a second color, so that an image can be displayed.

Follows are embodiments for manufacturing the dual-frequency bistable liquid crystal display, the operating parameters for forming the dual-frequency cholesteric liquid crystal by mixing of the dual-frequency liquid crystal and the chiral compound, and the manufacturing parameters for manufacturing the dual-frequency bistable liquid crystal display by using the dual-frequency cholesteric liquid crystal, and relative structures are also disclosed.

Embodiment 1: dual-frequency bistable liquid crystal mixture and dielectric permittivity performance.

The dual-frequency bistable liquid crystal display of the present invention is made of the HEF951700-100 dual-frequency nematic liquid crystal and the chiral compounds S5011 and S811.

The dual-frequency nematic liquid crystal, at the temperature of 25° C. has the dielectric permittivity performances as shown in the following table:

TABLE 1

| dielectric | HEF951700-100 frequency | |
|---|---|---|
| | 100 Hz | 50K Hz |
| $\epsilon_{//}$ (25° C.) | 11.2 | 4.0 |
| $\epsilon_{\perp}$ (25° C.) | 7.3 | 5.0 |
| $\Delta\epsilon$ (25° C.) | +3.9 | −1.0 |

As shown in Table 1, the negative switching frequency of the present invention is 50 KHz, when it is higher than this negative switching frequency, the dielectric anisotropy parameter is negative. The positive switching frequency of the present invention is 100 Hz, when it is lower than this positive switching frequency, the dielectric anisotropy parameter is positive, thus forming a dual frequency structure.

Embodiment 2: dual-frequency bistable liquid crystal display.

As shown in FIG. 3, the dual-frequency bistable liquid crystal mixture obtained in the first embodiment is filled in the liquid crystal cell 10 whose perpendicular distance D is 4 μm, wherein the inner surfaces 111, 121 of the two substrates 11, 12 of the liquid crystal cell 10 are each coated with the parallel alignment layers 15, 16, and one of the alignment layers 15, 16 is subjected to a directional rubbing process. In this embodiment, the color layer 17 of the liquid crystal cell 10 is a black light absorbing film. When a low frequency 50 Hz voltage is applied, the pixels of the liquid crystal cell 10 are shown in black, and when a high frequency 50 KHz voltage is applied, the pixels of the liquid crystal cell 10 are shown in green.

Furthermore, the components of the dual-frequency bistable liquid crystal mixture can also be mixed in other proportions, such as 60 wt % of dual-frequency liquid crystal, 37.5 wt % nematic liquid crystal mixture, and 2.5 wt % chiral compound S5011 are mixed together to obtain a dual-frequency bistable liquid crystal mixture with yellow substrate.

In general, with the abovementioned dual-frequency bistable liquid crystal mixture and the liquid crystal cell 10, the liquid crystal mixture of the present invention has the characteristics of both the dual-frequency liquid crystal and cholesteric liquid crystal. The present invention is driven in a frequency modulation mode and can be switched between two optical states by taking advantage of the dielectric anisotropy of the liquid crystal. Therefore, when the frequency is low, the liquid crystal will have high positive dielectric anisotropy and will be aligned in parallel to the electric field, and the liquid crystal molecules will be converted into the focal-conic texture because of the cholesteric characteristic, so that the liquid crystal mixture is switched to a state wherein a black color is displayed. Furthermore, when the frequency is high, the liquid crystal molecules will have negative dielectric anisotropy and will be aligned in perpendicular to the electric field, and the liquid crystal molecules will be converted into the planar texture because of the cholesteric characteristic, so that the liquid crystal mixture of the present invention is switched to a state in which a helical pitch-related color is displayed. The present invention is switched between two optical states by taking advantage of the dielectric anisotropy of the liquid crystal, the switching time between two optical states is short, and the two optical states contrast is sharp. Since it is driven by the frequency modulation, the maintaining of the two optical states requires no voltage, which does not require the use of a high voltage to destabilize the helical structure of the cholesteric liquid crystal, and does not have to go through a metastable stage. Hence, the power consumption and switching time are truly reduced.

While we have shown and described various embodiments in accordance with the present invention, it is clear to those skilled in the art that further embodiments may be made without departing from the scope of the present invention.

What is claimed is:

1. A dual-frequency bistable liquid crystal display comprising: a liquid crystal cell filled with a liquid crystal, the liquid crystal cell including two opposite substrates, each of substrates having an inner surface and an outer surface, and the two inner surfaces face toward each other, and on each the inner surface being provided an electrode layer, at least on one of the electrode layers being provided an alignment layer, and a color layer being provided on the outer surface of one of the substrates; the dual-frequency bistable liquid crystal display being characterized in that:

the liquid crystal is a dual-frequency liquid crystal mixture formed by mixing dual-frequency liquid crystal, chiral compound, and a nematic liquid crystal mixture together, when at a low frequency, a dielectric anisotropy of the dual-frequency liquid crystal mixture is positive, and when at a high frequency, the dielectric anisotropy of the dual-frequency liquid crystal mixture is negative, and a dielectric anisotropy positive to negative switching frequency ranges from 50 Hz-50000 Hz.

2. The dual-frequency bistable liquid crystal display as claimed in claim 1, wherein the dual frequency of the dual-frequency liquid crystal mixture includes a negative switching frequency and a positive switching frequency which are respectively greater than and smaller than the dielectric anisotropy positive to negative switching frequency, when frequency is higher than the negative switching frequency, a dielectric anisotropy parameter is negative, when frequency is lower than this positive switching frequency, the dielectric anisotropy parameter is positive.

3. The dual-frequency bistable liquid crystal display as claimed in claim 1, wherein the dual-frequency liquid crystal mixture contains 15-80 wt % of dual-frequency liquid crystal, 1-50% chiral compound, and 15-80 wt % nematic liquid crystal mixture.

4. The dual-frequency bistable liquid crystal display as claimed in claim 1, wherein the dual-frequency liquid crystal contains the liquid crystal mixture of the following compound A:

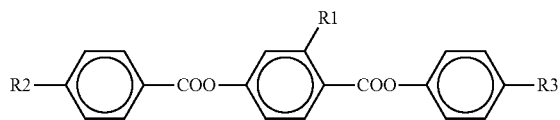

the side group R1 of the compound A is selected from the following groups: cyano group (—C≡N), nitro group (—NO$_2$) or halides, the halides is selected from the following groups: the —F group, —Cl group, —Br group, —I group, or —At group, the first and second end groups R2, R3 are selected from the following groups: -alkyl group, -alkoxy group, alkenyl group, alkenyloxy group, cyano group(—C≡N).

5. The dual-frequency bistable liquid crystal display as claimed in claim 4, wherein a side group R1 is F group or —Cl group or NC— group, and a first and a second end groups R2, R3 are alkyl group.

6. The dual-frequency bistable liquid crystal display as claimed in claim 1, wherein the nematic liquid crystal mixture consists of the following compound B:

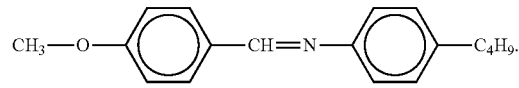

7. The dual-frequency bistable liquid crystal display as claimed in claim 1, wherein an optical birefringence of the liquid crystal ranges from 0.05 to 0.4.

8. The dual-frequency bistable liquid crystal display as claimed in claim 1, wherein a helical pitch of a liquid crystal molecule of the liquid crystal is 0.3 μm-4 μm.

9. The dual-frequency bistable liquid crystal display as claimed in claim 1, wherein a temperature of the liquid crystal ranges —40° C. ~80° C.

10. The dual-frequency bistable liquid crystal display as claimed in claim 1, wherein the dual-frequency liquid crystal mixture will have high negative dielectric anisotropy when applied with a frequency higher than the negative switching frequency, $\Delta\epsilon=-0.1\sim-20$, and the dual-frequency bistable liquid crystal mixture will have high positive dielectric anisotropy when applied with a frequency lower than the positive switching frequency, $\Delta\epsilon=1\sim30$.

11. The dual-frequency bistable liquid crystal display as claimed in claim 1, wherein the alignment layer is disposed on the electrode layer in a parallel or perpendicular manner by being subjected the alignment layer to disposition, coating or printing process.

12. The dual-frequency bistable liquid crystal display as claimed in claim 1, wherein the alignment layer is disposed on both of the electrode layers.

13. The dual-frequency bistable liquid crystal display as claimed in claim 1, wherein the two substrates of the liquid crystal cell are made of glass plate or plastic plate, and a distance ranging from 1-2 μm is defined between the inner surfaces of the two substrates.

14. The dual-frequency bistable liquid crystal display as claimed in claim 1, wherein the color layer of the dual-frequency bistable liquid crystal display is subjected to disposition, coating or printing process to become a black layer or a color layer.

15. The dual-frequency bistable liquid crystal display as claimed in claim 1, wherein the electrode layers are processed into a transparent conductive electrode after being subjected to disposition and etching process.

16. The dual-frequency bistable liquid crystal display as claimed in claim 1, wherein the liquid crystal cell includes an optical layer disposed on the color layer of one of the substrates of the liquid crystal cell or on the outer surface of another one of the substrates.

17. The dual-frequency bistable liquid crystal display as claimed in claim 1, wherein the liquid crystal cell includes two optical layers disposed on the color layer of one of the substrates of the liquid crystal cell or on the outer surface of another one of the substrates.

* * * * *